UNITED STATES PATENT OFFICE.

ERNEST AUGUSTUS MEBUS, OF NEW YORK, N. Y.

PURIFICATION OF BRINE.

SPECIFICATION forming part of Letters Patent No. 304,341, dated September 2, 1884.

Application filed October 23, 1883. (No specimens.)

*To all whom it may concern:*

Be it known that I, ERNEST AUGUSTUS MEBUS, of the city, county, and State of New York, have discovered certain new and useful Improvements in the Purification of Brine or of Solutions of Common Salt, of which the following is a full, true, and exact description.

Brine and solutions of common salt, whether natural or artificially prepared, always contain calcium and magnesium salts as impurities, which greatly interfere in the manufacture of salt, soda-ash, and other chemicals, and deteriorate the value of the manufactured products; hence it is desirable to purify the brine or solutions of salt before using the same for said manufactures.

My invention consists in precipitating the said impurities by adding to the brine a carbonate of an alkali and a caustic alkali, either in solid form or in solution. Lime also may be used instead of the caustic alkali. I have, however, found that the precipitation of the impurities remains incomplete at ordinary temperature, and it is therefore desirable to heat the brine or solution of salt to a higher temperature, either before the substances named are added to it or afterward. I have found a temperature of 60° to 70° centigrade to be sufficient for the purpose. The quantities of the purifying substances required vary of course with the quantity of calcium and magnesium salts contained in the brine or solution of salt. I prefer to employ for every one hundred pounds of lime contained in or equivalent to the calcium salts in the brine two hundred and fifty pounds of the carbonate of an alkali, and for every one hundred pounds of magnesia contained in or equivalent to the magnesium salts in the brine one hundred and fifty pounds of caustic alkali or lime. Supposing a brine to contain two-tenths per cent. of lime and two one-hundredths per cent. of magnesia, I would thus prefer to employ for every ten thousand pounds of brine fifty pounds of carbonate of an alkali and three pounds of caustic alkali or lime.

I am aware that it has been proposed to superheat brine under pressure to a high temperature with alkali or lime to precipitate the impurities; but this is expensive, takes considerable time, and requires the use of extensive machinery. By the process above described the result is effected in ordinary vessels without any increase of pressure.

What I claim as my invention, and desire to secure by Letters Patent, is—

The process of purifying brine or solutions of salt, which consists in artificially raising the temperature of the liquid under atmospheric pressure and adding thereto a carbonate of an alkali and a caustic alkali or its equivalent, substantially as described.

ERNEST AUGUSTUS MEBUS.

Witnesses:
GEO. H. EVANS,
WM. A. POLLOCK.